US006969332B2

(12) United States Patent
Sakamoto et al.

(10) Patent No.: US 6,969,332 B2
(45) Date of Patent: Nov. 29, 2005

(54) SILENT CHAIN

(75) Inventors: Naoji Sakamoto, Nabari (JP); Hiroyuki Takeda, Nabari (JP); Akio Matsuda, Hisai (JP)

(73) Assignee: Borg-Warner Automotive K.K., Nabari (JP)

( * ) Notice: Subject to any disclaimer, the term of this patent is extended or adjusted under 35 U.S.C. 154(b) by 0 days.

(21) Appl. No.: 09/874,137

(22) Filed: Jun. 5, 2001

(65) Prior Publication Data

US 2002/0169046 A1 Nov. 14, 2002

(30) Foreign Application Priority Data

| | | |
|---|---|---|
| Jun. 5, 2000 | (JP) | 2000-167164 |
| Jun. 5, 2000 | (JP) | 2000-167168 |

(51) Int. Cl.[7] .................... F16G 13/04
(52) U.S. Cl. .................... 474/212; 474/213; 474/228
(58) Field of Search .................... 474/212–175, 474/217, 148, 206, 140, 226, 228; 59/78.1, 59/78

(56) References Cited

U.S. PATENT DOCUMENTS

| | | | | |
|---|---|---|---|---|
| 4,509,937 A * | 4/1985 | Ledvina et al. | ............. | 474/213 |
| 4,758,209 A * | 7/1988 | Ledvina | ............. | 474/212 |
| 5,464,374 A * | 11/1995 | Mott | ............. | 474/228 |
| 5,967,926 A * | 10/1999 | Kozakura et al. | ............. | 474/213 |
| 5,989,140 A * | 11/1999 | Ichikawa et al. | ............. | 474/148 |
| 6,155,944 A * | 12/2000 | Matsuda | ............. | 474/213 |
| 6,171,209 B1 * | 1/2001 | Matsuda | ............. | 474/212 |
| 6,364,800 B1 * | 4/2002 | Avramidis et al. | ............. | 474/213 |

FOREIGN PATENT DOCUMENTS

| | | | |
|---|---|---|---|
| JP | 04-46241 A * | 2/1992 | ................. 474/213 |

* cited by examiner

*Primary Examiner*—Marcus Charles
(74) *Attorney, Agent, or Firm*—Fitch, Even, Tabin & Flannery; Greg Dziegielewski

(57) ABSTRACT

A silent chain comprises a plurality of link plates, each having a pair of tooth parts and pin holes, stacked in the thickness direction as well as in the length direction and linked together using linking pins. Guide links are provided on the outermost sides of the link plates and are press-fit to the ends of linking pins. The guide links and link plates are relatively positioned to reduce wear on a chain guide surface by causing either the guide links or the link plates to substantially contact the guide surface.

7 Claims, 11 Drawing Sheets hl' = hg' hg > hl

PRIOR ART

PRIOR ART

FIG. 14a
PRIOR ART
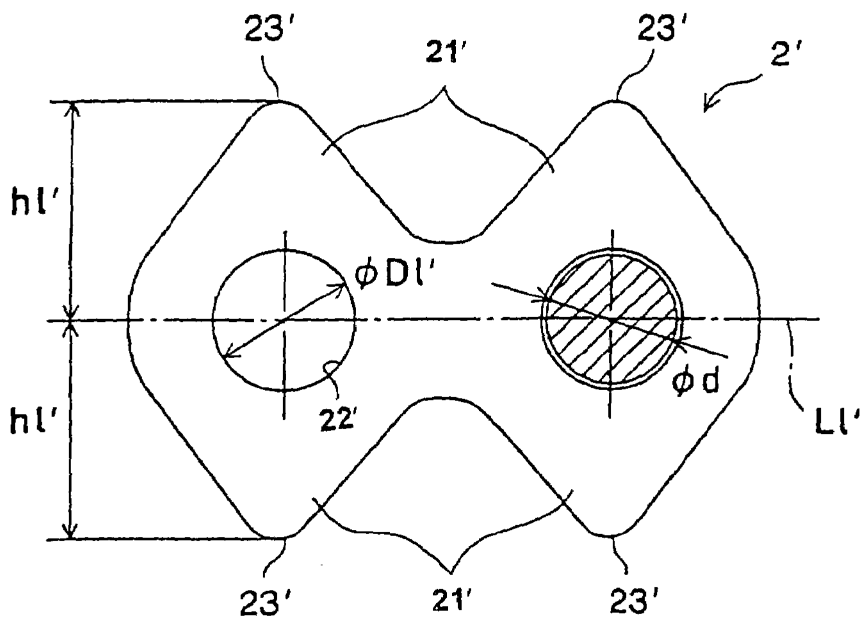
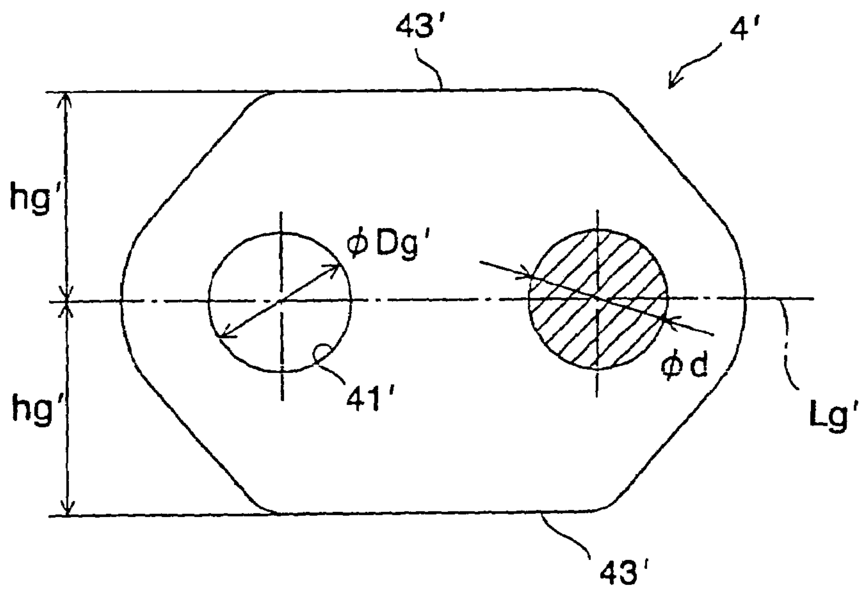
FIG. 14b
PRIOR ART
hl' = hg'

SILENT CHAIN

FIELD OF THE INVENTION

The present invention pertains to a silent chain; more specifically, to a silent chain that reduces abrasion of the guiding surface of a chain guide used with the silent chain.

BACKGROUND OF THE INVENTION

A silent chain may be used as a power transmission chain or a timing chain for an automobile or a motorcycle. As illustrated in FIGS. 5 and 6, for example, a silent chain 1' may have a configuration in which many link plates 2' each having a pair of tooth parts 21' and pin holes 22' are stacked in the thickness direction as well as in the length direction, and respective link plates 2' are linked together using linking pins 3' inserted into respective pin holes 22'. Guide links 4' can be provided on the outermost sides of link plates 2', and the ends of linking pins 3' can be fixed in pin holes 41' of guide links 4'. Furthermore, here, a case is exemplified in which a so-called low rigidity guide link, which has a crotch part created on its rear side, can be utilized for the guide link.

In this kind of silent chain, as illustrated in FIG. 7*a*, the link hole diameter of link plate 2' can be denoted as ϕDl', and the pin diameter of linking pin 3' as ϕd, establishing a relationship that may be expressed as ϕDl'>ϕd. In addition, as illustrated in FIG. 7*b*, the pin hole diameter of guide link 4' can be denoted as ϕDg', establishing a relationship that can be expressed as ϕDg'<ϕd.

In other words, link plate 2' and linking pin 3' may be fitted with a clearance, whereby respective link plates 2' can rotate around linking pins 3' in order to allow the entire chain to bend. Conversely, guide link 4' and linking pin 3' may be fitted tightly, and respective guide links 4' are press-fit to linking pins 3', whereby, linking pins 3' can be prevented from falling out.

In addition, the distance from pin hole centerline Ll' of link plate 2' to rear surface or chain guide contact surface 23' can be denoted as hl', and the distance from pin hole centerline Lg' of guide link 4' to rear surface or chain guide contact surface 43' of guide link 4' can be denoted as hg', establishing a relationship that may be expressed as hl'=hg'.

As illustrated in FIG. 8, when the silent chain with such a configuration is driven, wear 52 may result due to abrasion of guiding surface 51 of chain guide 5.

The following mechanism may be considered to account for this wear. When a conventional silent chain makes contact with the chain guide, clearance c (=ϕDl'−ϕd) may be created between pin holes 22' of respective link plates 2' and linking pins 3', as illustrated in FIG. 9. Accordingly, clearance e' (=c/2) may be created between guiding surface 51 of chain guide 5 and the rear surface 23' of respective link plates 2'.

When a conventional silent chain runs on guiding surface 51 of chain guide 5 under such conditions, if only guide links 4' make contact with guiding surface 51, the pressure of the contact surface against the guiding surface 51 may increase. As a result, edge-like abrasive wear 52 may be created on guiding surface 51 after the chain is driven for some time, if only guide links 4' make contact with the guiding surface 51.

Another configuration of a silent chain may comprise a rear wheel-driving silent chain, such as used as power transmission chains or timing drive chains for automobiles and motorcycles, is illustrated in FIGS. 12 and 13, where like reference numerals with the above-described conventional silent chain generally indicate similar elements in the conventional rear wheel-driving silent chain. For example, rear wheel-driving silent chain 1' may comprise a plurality of link plates 2', each having a pair of pinholes 21' and a pair of teeth 22' on either side of the center line of the pinholes, stacked in the thickness direction as well as in the length direction. Respective link plates 2' may be linked together using linking pins 3' inserted into respective pinholes 21'. Guide links 4' can be provided on the outermost sides of link plates 2', and ends of linking pins 3' can be fixed in pinholes 41' of guide links 4'.

In this kind of rear wheel-driving silent chain, as illustrated in FIG. 14*a*, the link hole diameter of link plate 2' can be denoted as ϕDl', and the pin diameter of linking pin 3' can be denoted as ϕd, establishing a relationship which may be expressed as ϕDl'>ϕd. In addition, as illustrated in FIG. 14*b*, the pin diameter of guide link 4' can denoted as ϕDg', establishing a relationship which may be expressed as ϕDg'<ϕd.

In other words, link plate 2' and linking pin 3' are formed with a clearance; whereby, respective link plates 2' rotate around linking pins 3' in order to allow the entire chain to bend. In contrast, guide link 4' and linking pin 3' may be fit together tightly, and respective guide links 4' may be press-fit to linking pins 3'; whereby, linking pins 3' can be prevented from falling out.

In addition, the distance from pinhole center line Ll' of link plate 2' to chain guide contact face 23' is denoted as hl', and the distance from pinhole center line Lg' of guide link 4' to chain guide contact face 43' of guide link 4' can be denoted as hg', establishing a relationship which may be expressed as hl'=hg'. Furthermore, in this case, chain guide contact faces 23' and 43' are provided respectively on either side of pinhole center lines Ll' and Lg' of link plate 2' and guide link 4'.

As illustrated in FIG. 15, when this kind of conventional rear wheel-driving silent chain contacts the chain guide, clearance c (=ϕDl'−ϕd) is created between pinholes 21' of respective link plates 2' and linking pins 3'. Accordingly, clearance e' (=c/2) is created between guiding face 51 of chain guide 5 and chain guide contact face 23' of respective link plates 2'.

It is conceivable to eliminate such clearance e' in order for chain guide contact face 23' of link plate 2' to contact guiding face 51 of chain guide 5. However, chain guide contact face 23' is provided at the tip of triangular tooth 22', so that the area in contact with guiding face 51 is small. Thus, when chain guide contact face 23' contacts guiding face 51, the contact face pressure on chain guide contact face 23' increases, and abrasion of chain guide contact face 23' and guiding face 51 can be assumed to take place. In contrast, chain guide contact face 43' of guide link 4' is a flat surface, so that the area in contact with guiding face 51 is large.

SUMMARY OF THE INVENTION

The present invention is directed to a silent chain which reduces abrasion of the guiding surface of a chain guide. According to an aspect of the invention, guide links and link plates may be arranged such that the guide links substantially contact the chain guide. According to another aspect of the invention, guide links and link plates may be arranged such that the link plates substantially contact the chain guide.

According to an aspect of the invention, a silent chain in which many link plates each having a pair of tooth parts and pin holes are stacked in the thickness direction as well as in the length direction and are linked together using linking pins, guide links are provided on the outermost sides, and the guide links are fixed to the ends of the linking pins, when the distance from the pin hole centerline of the link plate to the surface facing chain guide can be denoted as hl, and the distance from the pin hole centerline of the guide link to the surface facing the chain guide can be denoted as hg, a relationship that can be expressed as hl>hg may be established.

Therefore, the chain guide contact surface of the link plate can be brought closer to the guiding surface than in a conventional chain, and contact may be made with the chain guide. Accordingly, intensive contact between the guide links alone and the guiding surface of the chain guide can be limited. As a result, abrasion of the guiding surface of the chain guide can be reduced.

In an aspect of the silent chain of the invention, the clearance between the pin hole of the link plate and the linking pin can be denoted as c, and a relationship that can be expressed as hl≧hg+c/2 may be established.

In such a case, when contact is made with the chain guide, the chain guide contact surface of the link plate can be reliably brought into contact with the guiding surface of the chain guide. Accordingly, contact surface pressure against the guiding surface can be reduced, so that abrasion of the guiding surface can be further reduced.

In another aspect of the silent chain of the invention, the guide link may comprise a low rigidity guide link in which a crotch part can be created in the surface facing the chain guide or the rear side.

In yet another aspect of the silent chain of the invention, the plate link may comprise a rear-driven link plate having a pair of tooth parts on either side of the pin hole centerline.

In another aspect of the silent chain of the invention, the surfaces at the shoulder parts of the guide link on the chain guide side do not protrude beyond the shoulder parts of the link plate on the chain guide side while in contact with the guiding surface of the chain guide.

Accordingly, contact is made with the guiding surface of the chain guide, the surfaces at the shoulder parts of the guide link on the chain guide side can be prevented from coming into contact with the guiding surface. As a result, uneven abrasion of the guiding surface of the chain guide caused by the shoulder parts of the guide link making contact can be prevented.

According to another aspect of the invention, a rear wheel-driving silent chain may comprise a plurality of link plates, each having a pair of pinholes and a pair of teeth on either side of the center line of the pinholes, stacked in the thickness direction as well as in the length direction and linked together using linking pins, and guide links on the outermost sides, where the guide links can be fixed to the ends of the aforementioned linking pins by means of press-fitting. If the distance from the pinhole center line of the aforementioned link plate to the surface facing the chain guide is denoted as hl, and if the distance from the pinhole center line of the aforementioned guide link to the surface facing the chain guide is denoted as hg, the relationship hg>hl is established.

Because the aforementioned relationship is established, the clearance between the chain guide contact face of the link plate and the guiding face of the chain guide may be greater than c/2 (c: clearance between the pinhole of the link plate and the linking pin) while in contact with the chain guide when compared with a conventional chain. Thus, only the chain guide contact face of the guide link contacts the guiding face of the chain guide over a long driving time. As a result, the contact face pressure of the chain guide acting on the guiding face can be reduced, so that abrasion of the guiding face can be reduced.

In contrast, for the case of the conventional rear wheel-driving silent chain, the clearance between the chain guide contact face of the link plate and the guiding face of the chain guide may be merely c/2 while in contact with the chain guide. If the total amount of abrasion of the chain guide contact face of the guide link and the guiding face of the chain guide exceeds c/2, the chain guide contact face of the link plate may contact the guiding face of the chain guide, so that the contact pressure on the guiding face increases, and wear may be generated on the guiding face.

In another aspect of a silent chain according to an aspect of the invention, the clearance between the pinhole of the aforementioned link plate and the aforementioned linking pin may be denoted as c, establishing a relationship which may be expressed as hg≧hl+c/2.

In this case, the clearance between the chain guide contact face of the link plate and the guiding face of the chain guide may be greater than or equal to c while in contact with the chain guide. Thus, even after abrasion of the chain guide contact face of the guide link and the guiding face of the chain guide are taken into consideration, only the chain guide contact face of the guide link may be brought into contact with the guiding face of the chain guide over even longer driving times. As a result, abrasion of the guiding face can be further reduced.

BRIEF DESCRIPTION OF THE DRAWINGS

FIG. 14*a* is an expanded front view of a conventional link plate, and 14*b* is an expanded front view of a conventional guide link.

DETAILED DESCRIPTION OF PREFERRED EMBODIMENTS

Figure 1A:
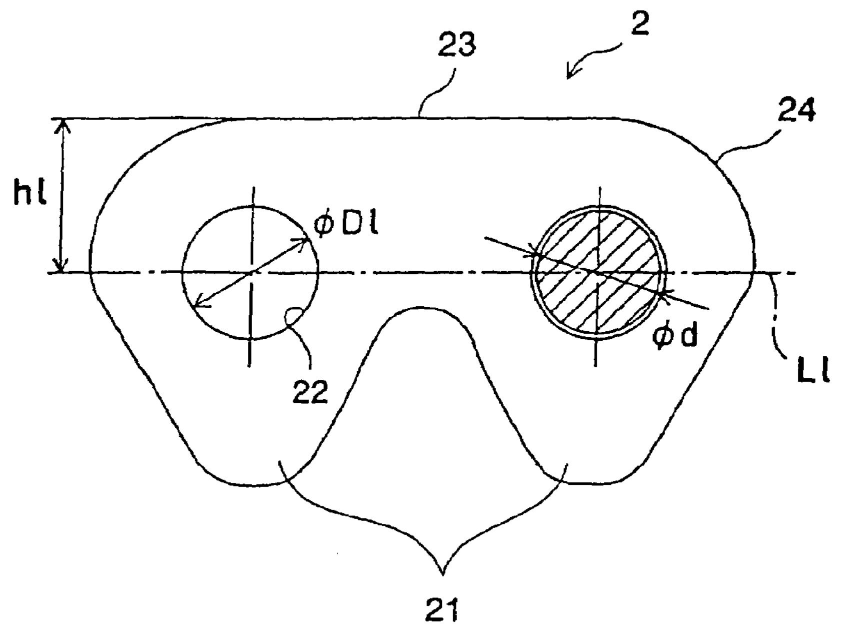
FIG. 1*a* is an expanded front view of a link plate of the silent chain in accordance with an aspect of the present invention, and 1*b* is an expanded front view of a guide link.
Figure 1B:
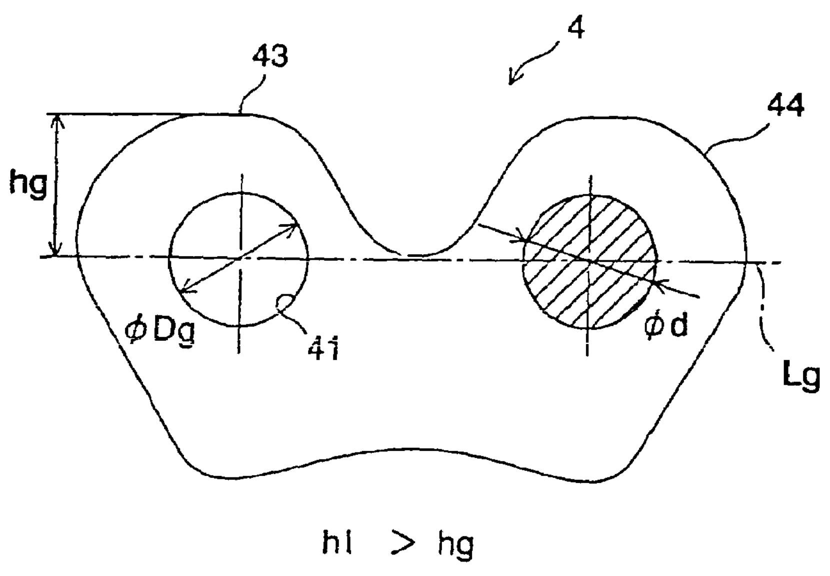
Figure 2:
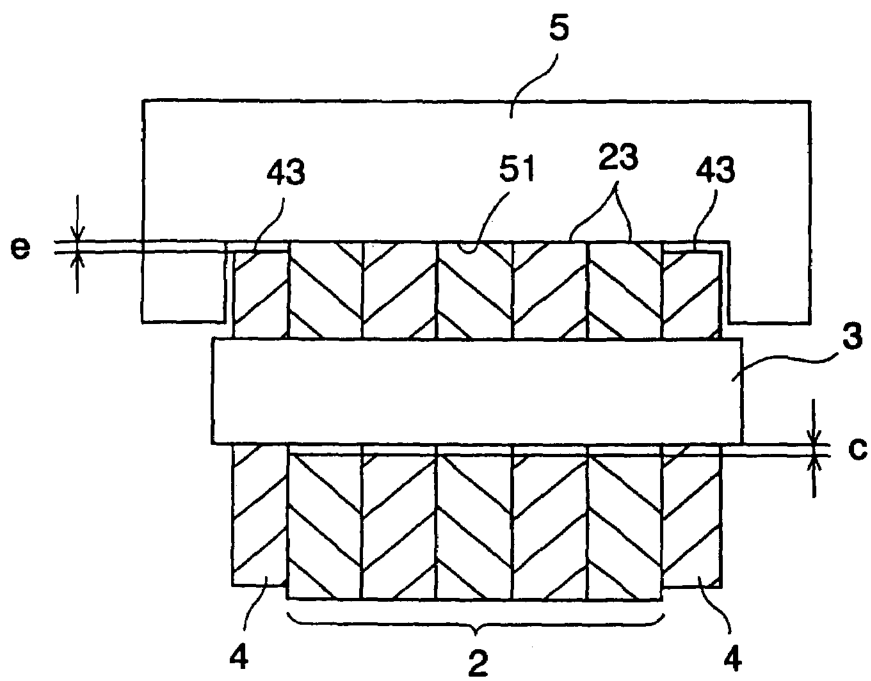
FIG. 2 is a diagram illustrating a positional relationship between the silent chain and the chain guide while contact is made with the chain guide.
Figure 3:
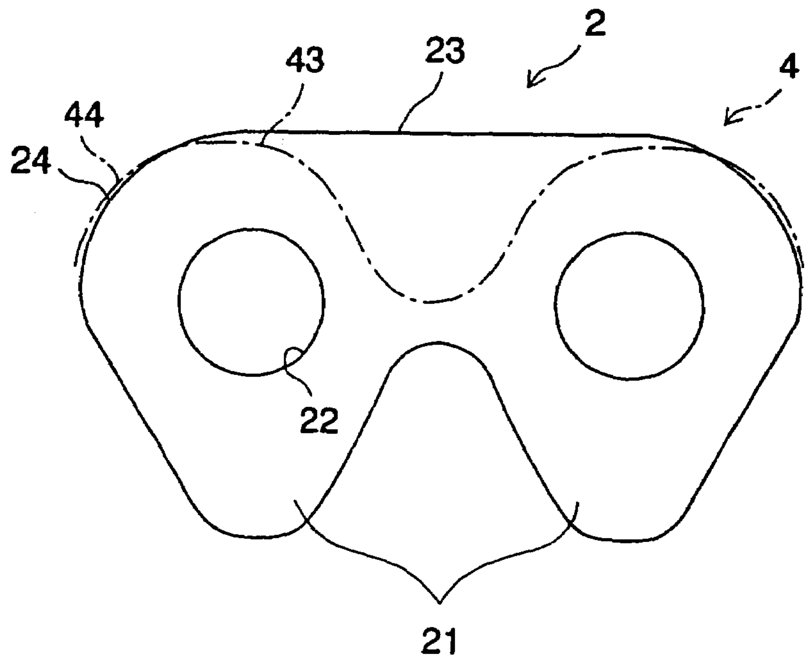
FIG. 3 is a diagram illustrating a positional relationship between the link plate and the guide link while contact is made with the chain guide.
Figure 4:
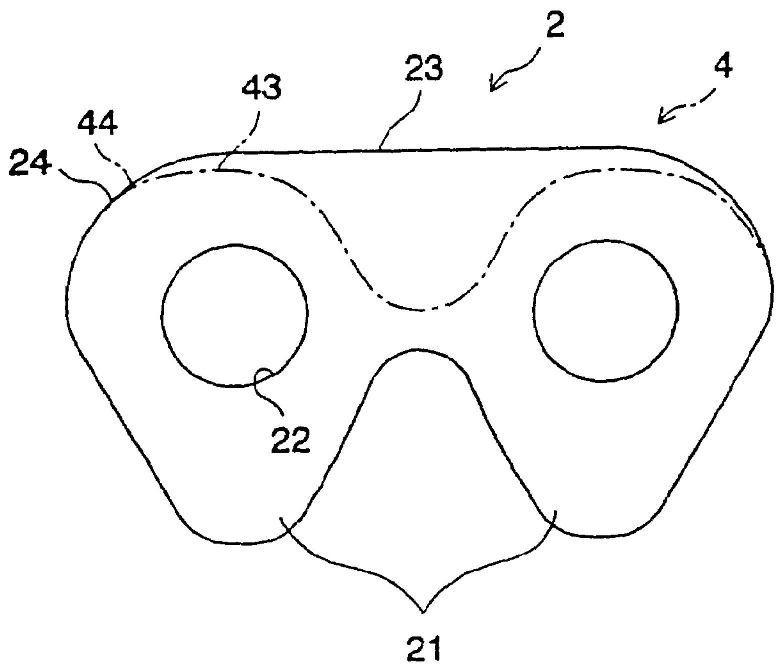
FIG. 4 is a diagram illustrating a preferred positional relationship between the link plate and the guide link while contact is made with the chain guide.
Figure 5:
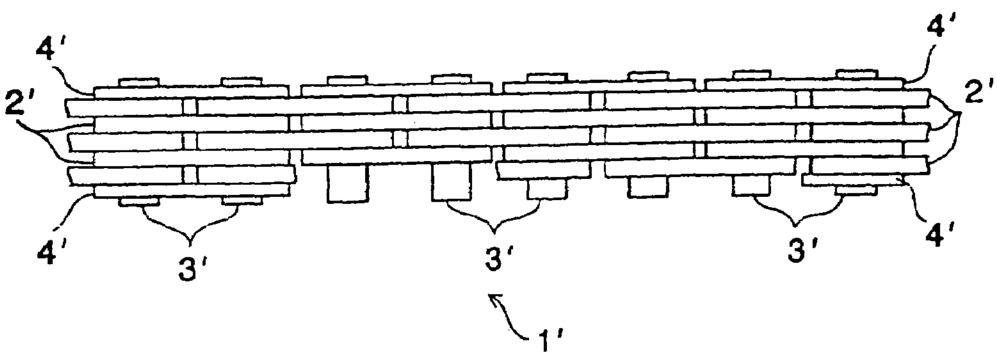
FIG. 5 is an outlined plane diagram of a conventional silent chain.
Figure 6:
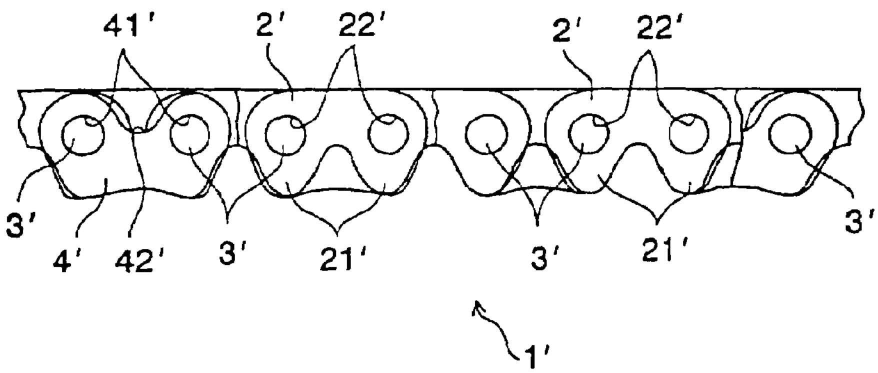
FIG. 6 is a schematic plan view of a conventional silent chain.
Figure 7A:
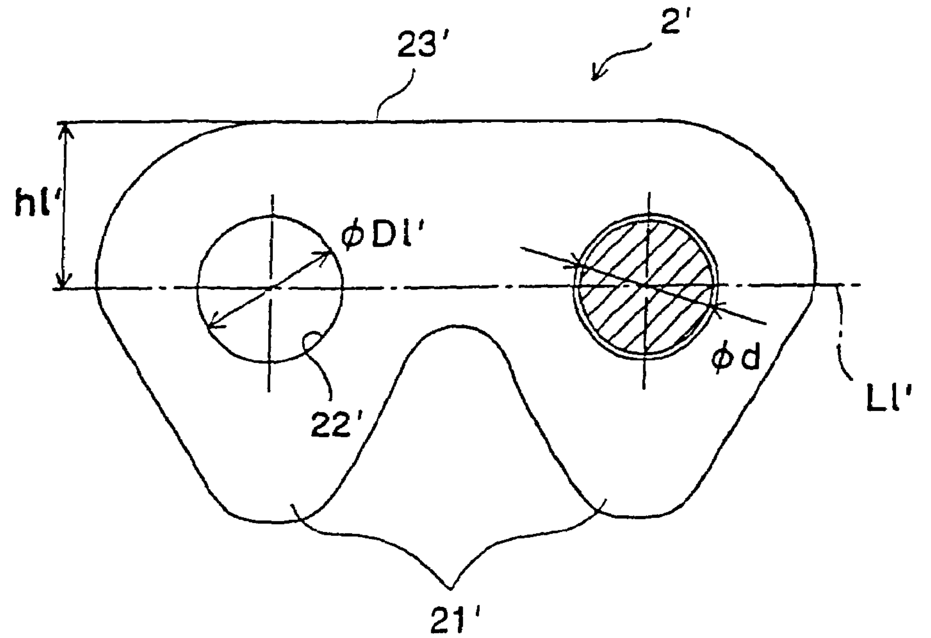
FIG. 7*a* is an expanded front view of a conventional link plate, and 7*b* is an expanded front view of a conventional guide link.
Figure 7B:
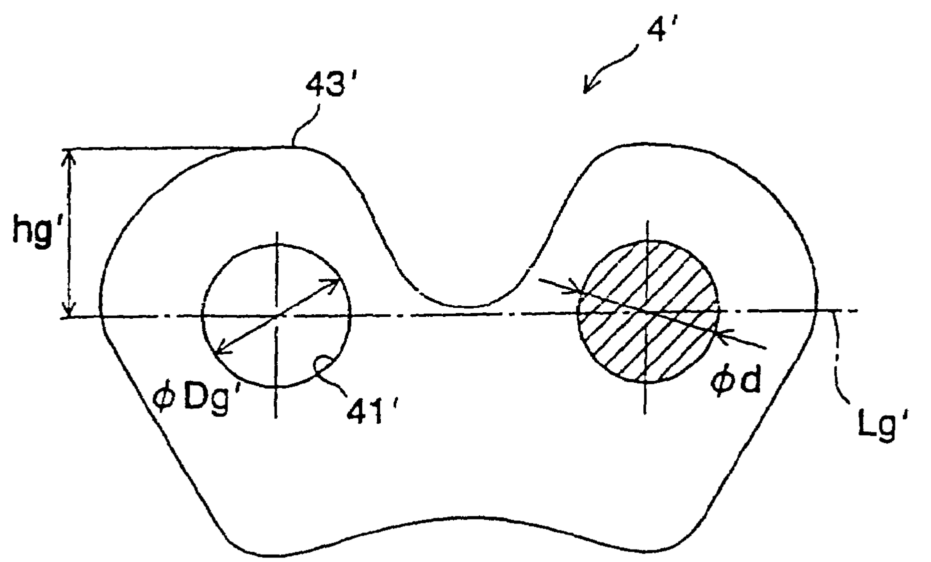
Figure 8:
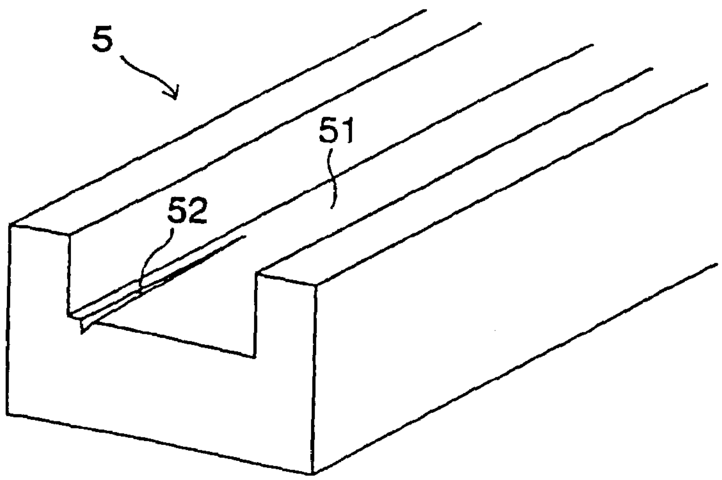
FIG. 8 is a diagram illustrating a problem with the conventional silent chain.

FIGS. 1–4 are diagrams explaining the silent chain according to an aspect of the present invention. The expanded front view of the link plate of the silent chain is illustrated in FIG. 1*a* while FIG. 1*b* is an expanded front view of the guide link of the silent chain, FIG. 2 is a diagram illustrating the positional relationship between the silent chain and the chain guide while contact is made with the chain guide, and FIGS. 3 and 4 are diagrams illustrating the positional relationship between the link plate and the guide link while contact is made with the chain guide. Furthermore, since the overall configuration of the rear-driven silent chain is almost identical to the silent chain explained in FIGS. 5 and 6, detailed explanation for these will be omitted.

As is illustrated in FIG. 1*a*, link plate 2 that is a constituent of the silent chain according to the present embodiment has a pair of tooth parts 21 projecting downward and a pair of pin holes 22 respectively provided on either side for inserting linking pins.

Then, when the pin hole diameter of link plate 2 is denoted as ϕDl, and the pin diameter is denoted as ϕd, a relationship expressed as ϕDl>ϕd is established in order to allow link plate 2 to rotate around the linking pin. In addition, as illustrated in FIG. 1*b*, when the pin hole diameter of guide link 4 is denoted as ϕDg, because the end of the linking pin needs to be press-fit into pin hole 41 of guide link 4, a relationship expressed as ϕDg>ϕd is established.

Furthermore, when the distance from pin hole centerline Ll of link plate 2 to the rear surface or chain guide contact surface 23 is denoted as hl, and the distance from pin hole centerline Lg of guide link 4 to the rear surface or chain guide contact surface 43 of guide link 4 is denoted as hg, a relationship expressed as hl>hg is established.

Figure 9:
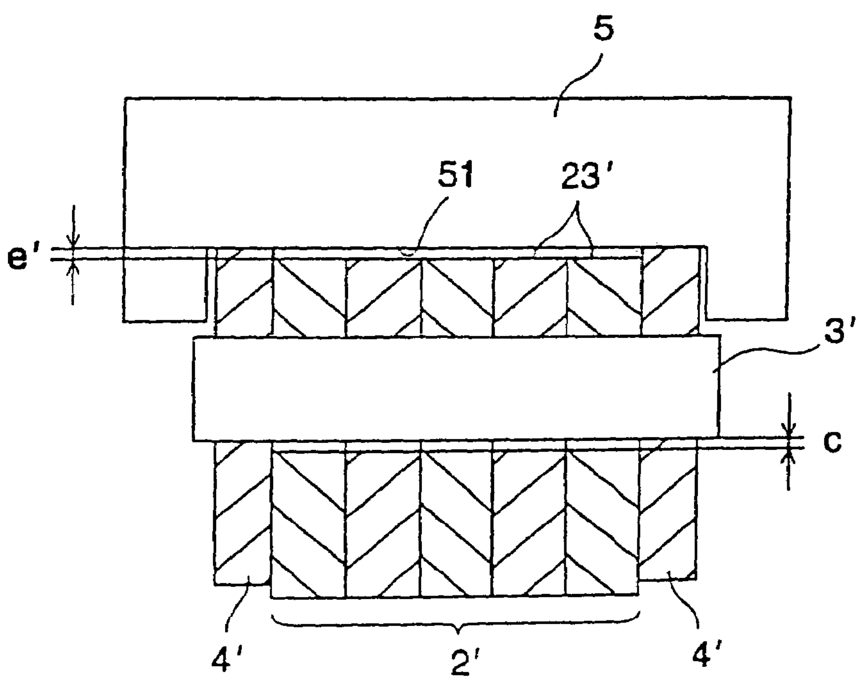
FIG. 9 is a diagram illustrating a positional relationship with a chain guide when a conventional silent chain makes contact with the chain guide.

In such a case, clearance e' illustrated in FIG. 9 is small, and the chain guide contact surface of the link plate is placed closer to the guiding surface of the chain guide. Accordingly, intensive contact between the guide links alone and the guiding surface of the chain guide can be limited. As a result, abrasion of the guiding surface of the chain guide can be reduced.

In addition, as is illustrated in FIG. 2, clearance e is created between surfaces 43 of guide links 4 and guiding surface 51 of chain guide 5 when rear surfaces 23 of respective link plates 2 are brought into contact with guiding surface 51 of chain guide 5 as the silent chain makes contact with chain guide 5. The clearance e can be expressed as e=hl−hg−c/2. Here, c indicates the clearance between pin hole 22 of link plate 2 and the linking pin.

In such a case, rear surfaces 23 of link plates 2 can be reliably brought into contact with guiding surface 51 of chain guide 5 during operation of the silent chain. Accordingly, the contact surface pressure against guiding surface 51 is reduced, so that abrasion of guiding surface 51 can be reduced.

Furthermore, when deciding the size of clearance e, it is desirable to take into consideration the point that a condition in which shoulder parts 44 of the guiding surface of guide link 4 protrude beyond shoulder parts 24 of link plates on the guiding surface side (FIG. 3) does not occur when the silent chain makes contact with the chain guide. That is, it is preferable that shoulder parts 44 of guide link 4 be in the same plane as shoulder parts 24 of link plate 2, or that shoulder parts 44 be placed inside shoulder parts 24, as is illustrated in FIG. 4.

In such a case, shoulder parts 44 of guide link 4 can be prevented from coming into contact with guiding surface 51 when contact is made with guiding surface 51 of chain guide 5. Accordingly, abrasion of guiding surface 51 caused by contact with shoulder parts 44 of guide link 4 can be prevented.

In an aspect of the invention, the clearance e, created between rear surface 43 of guide link 4 and guiding surface 51 of chain guide 5, may be zero. In such a case, a relationship expressed as hl−hg=c/2 is established.

According to another aspect of the invention, in the case of a chain with 6.35 mm pitch, the value of the hl−hg is approximately 0.2 mm, and it is preferable that it be greater than 0.2 mm in the case of a chain with a pitch greater than 6.35 mm.

In such a case, while contact is made with chain guide 5, not only rear surfaces 23 of link plate 2 but also rear surfaces 43 of guide link 4 make contact with guiding surface 51, so that the contact surface pressure against guiding surface 51 can be reduced, and abrasion of guiding surface 51 can be further reduced.

Furthermore, in this case, too, as described above, it is desirable that shoulder parts 44 of guide link 4 on the guiding surface's side do not protrude beyond shoulder parts 24 of link plate 2 on the guiding surface's side.

In another aspect of the invention, cases in which the relationship expressed as hl−hg≦c/2 is established have been explained. In actuality, while it is preferable that such a relational formula be satisfied by hl and hg, abrasion of guiding surface 51 can be reduced to some extent even when 0<hl−hg<c/2.

That is, in this case, only guide links 4 are prevented from making intensive contact with guiding surface 51 of chain guide 5. Accordingly, abrasion of guiding surface 51 of chain guide 5 can be reduced.

According to another aspect of the invention, a popular conventional guide link in the shape of a quasi-trapezoid may also be utilized. In addition, a rear-driven link plate having a pair of tooth parts on either side of the pin hole centerline may also be utilized for the link plate.

As has been described above, with the silent chain of the invention according to an aspect of the invention, when the distance from the pin hole centerline of the link plate to the surface facing the chain guide is denoted as hl, and the distance from the pin hole centerline of the guide link to the surface facing the chain guide is denoted as hg, a relationship expressed as hl>hg is established. Therefore, intensive contact between the guide links alone and the guiding surface of the chain guide can be limited. Accordingly, the invention provides an effect of reducing abrasion of the guiding surface of the chain guide.

In addition, with the silent chain of the invention according to another aspect of the invention, when the clearance between the pin hole of the link plate and the linking pin is denoted as c, a relationship expressed as hl≧hg+c/2 is established. In such a case, when contact is made with the chain guide, the chain guide contact surface of the link plate can be reliably brought into contact with the guiding surface of the chain guide. Accordingly, the invention provides an effect of reducing contact surface pressure against the guiding surface, so that abrasion of the guiding surface can be further reduced.

Another aspect of the invention is explained and illustrated in FIGS. 10–15, wherein like reference numerals indicate generally similar elements as in the previous aspects of the invention.

Figure 10A:
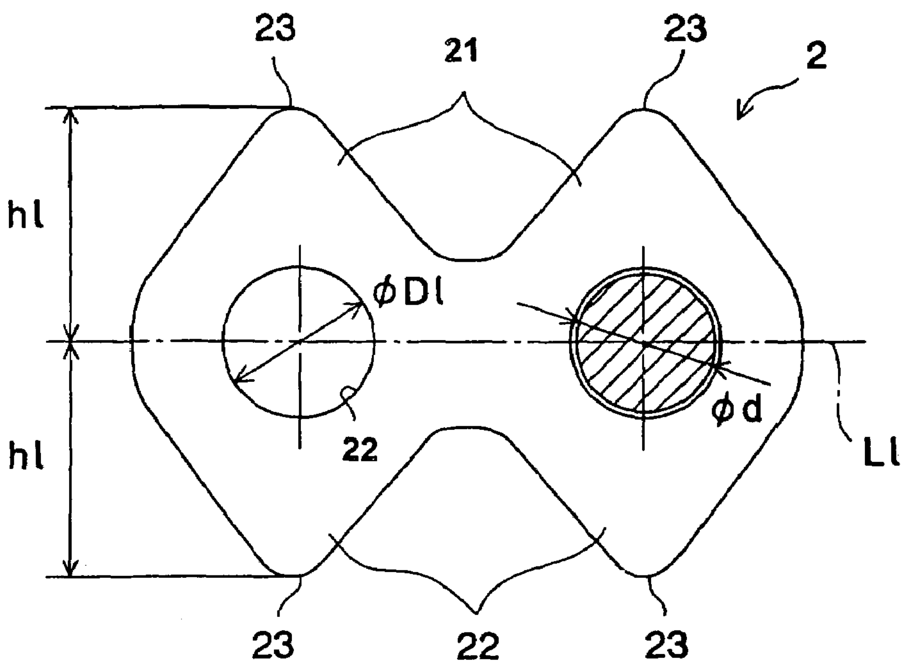
FIG. 10 is a rear wheel-driving silent chain in accordance with an aspect of the present invention; wherein 10*a* is an expanded front view of a link plate, and 10*b* is an expanded front view of a guide link.
Figure 10B:
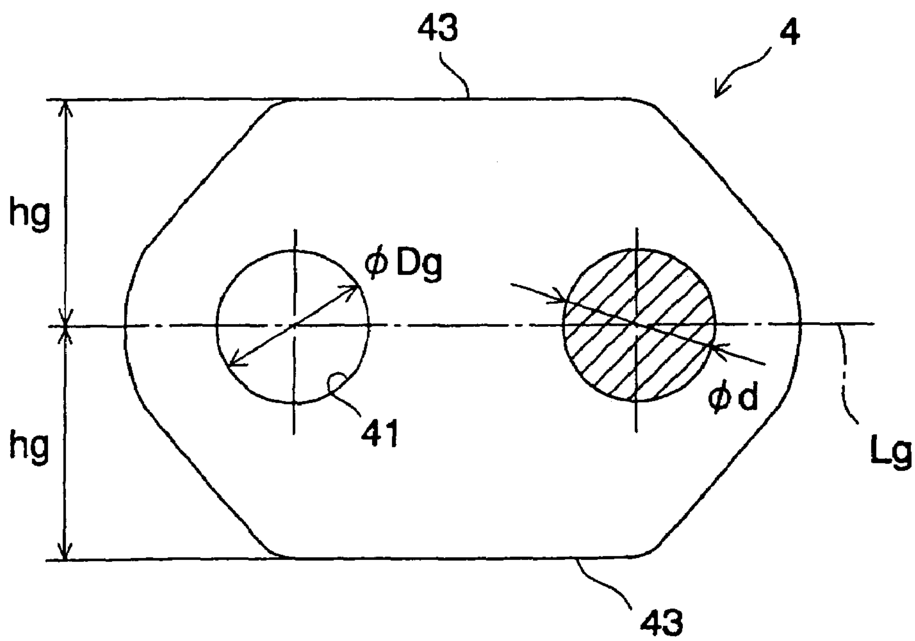
Figure 11:
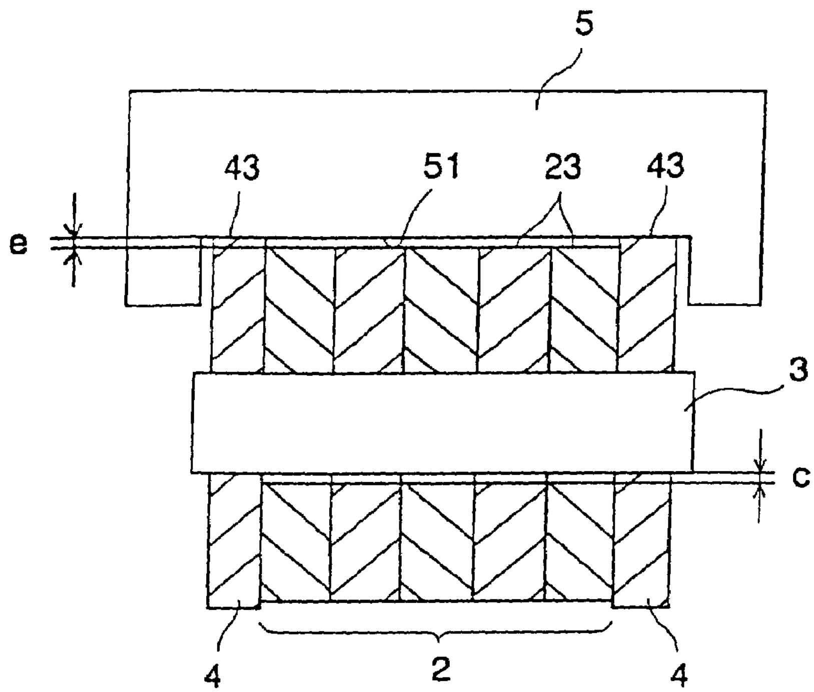
FIG. 11 is a diagram illustrating a positional relationship between a rear wheel-driving silent chain and a chain guide while in contact with the chain guide.
Figure 12:
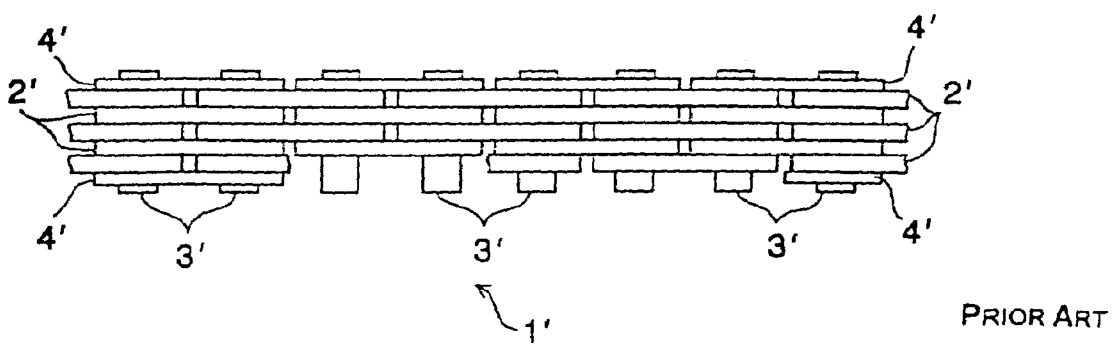
FIG. 12 is a schematic plan view of a rear wheel-driving silent chain.
Figure 13:
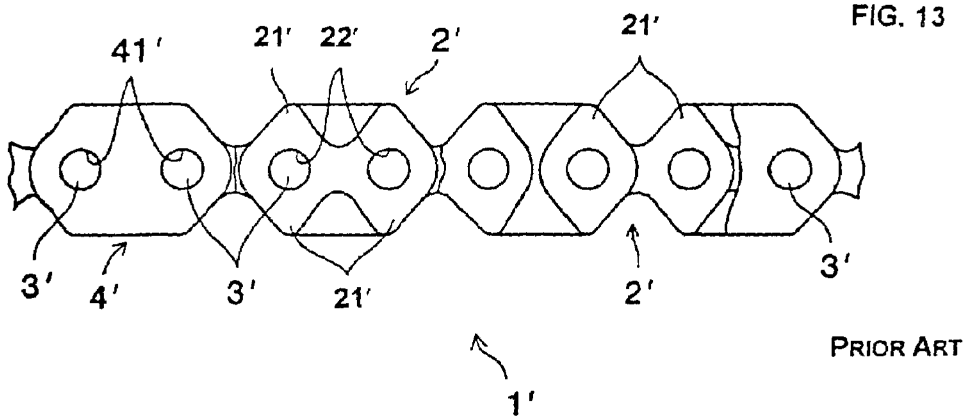
FIG. 13 is a schematic front view of a rear wheel-driving silent chain.
Figure 15:
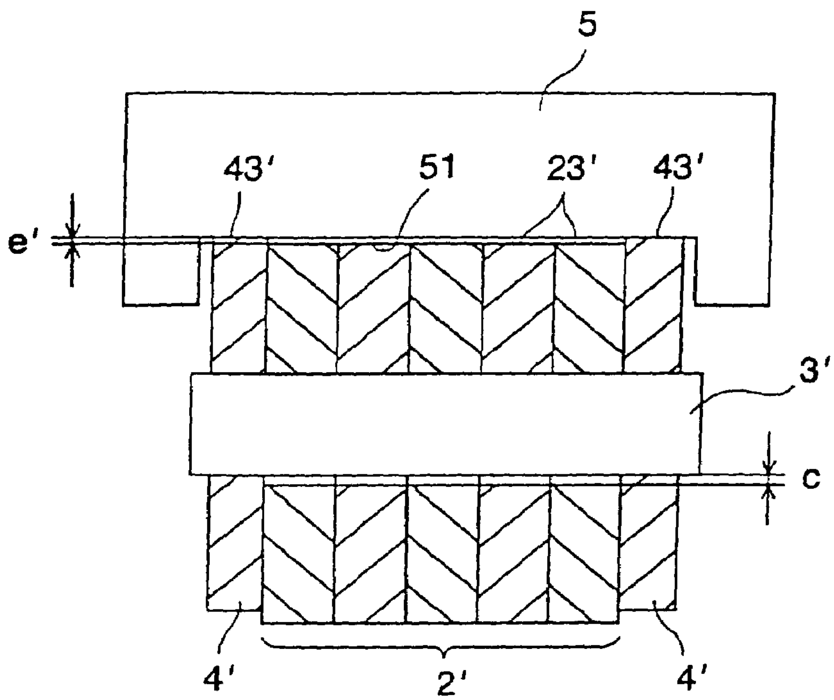
FIG. 15 is a diagram of a conventional rear wheel-driving silent chain illustrating its positional relationship to a chain guide while in contact with the chain guide.

FIGS. 10 and 11 are diagrams for explaining a rear wheel-driving silent chain in accordance with an aspect of the present invention. FIG. 10*a* is an expanded front view of the link plate of the silent chain, FIG. 10*b* is an expanded front view of the guide link of the silent chain, and FIG. 9 is a diagram illustrating the positional relationship between the silent chain and the chain guide while in contact with the chain guide. Furthermore, since the overall configuration of the rear wheel-driving silent chain is almost identical to the rear wheel-driving silent chain explained in FIGS. 12 and 13, a detailed explanation will be omitted here.

As illustrated in FIG. 10*a*, link plate 2 constituting the rear wheel-driving silent chain in accordance with the present embodiment has a pair of pinholes 21 provided on either side for linking pins and a pair of teeth 22 each provided on either side of pinhole center line Ll.

Then, if the pinhole diameter of link plate 2 is denoted as $\phi Dl$, if the pinhole diameter of the linking pins is denoted as $\phi d$, the relationship $\phi Dl > \phi d$ is established, which allows link plate 2 to rotate around the linking pin. In addition, as illustrated in FIG. 10*b*, if the pinhole diameter of guide link 4 is denoted as $\phi Dg$, because the end of the linking pin must be press-fit into pinhole 41 of guide link 4, the relationship $\phi Dg < \phi d$ is established.

Furthermore, if the distance from pinhole center line Ll of link plate 2 to chain guide contact face 23 is denoted as hl, and if the distance from pinhole center line Lg of guide link 4 to chain guide contact face 43 of guide link 4 is denoted as hg, the relationship $hg > hl$ is established. Furthermore, in this case, chain guide contact faces 23 and 43 are provided respectively on either side of pinhole center lines Ll and Lg of link plate 2 and guide link 4.

When the silent chain configured by combining such link plates 2 and guide links 4 contacts the chain guide, as illustrated in FIG. 11, the clearance between chain guide contact face 23 of link plate 2 and guiding face 51 of chain guide 5 is greater than c/2 (provided that $c = \phi Dl - \phi d$). As a result, only chain guide contact face 43 of guide link 4 contacts guiding face 51 of chain guide 5 over a long driving time, so that the contact face pressure of chain guide 5 acting guiding face 51 can be reduced, and abrasion of guiding face 51 can be reduced.

In contrast, when the conventional rear wheel-driving silent chain contacts chain guide 5, the clearance between the chain guide contact face of the link plate and the guiding face of the chain guide is merely c/2. Thus, if the total amount of abrasion of the chain guide contact face of the guide link and the guiding face of the chain guide exceeds c/2, the chain guide contact face of the link plate contacts the guiding face of the chain guide, so that the contact pressure to the guiding face increases, and wear is generated on the guiding face.

Although a case in which $hg > hl$ was explained in the aforementioned aspect of the invention, the relationship $hg \geqq hl + c/2$ may also be established. In this case, the clearance between chain guide contact face 23 of link plate 2 and guiding face 51 of chain guide 5 is greater than or equal to c while in contact with the chain guide. As a result, only chain guide contact face 43 of guide link 4 can be brought into contact with guiding face 51 of chain guide 5 over even longer driving times. Thus, abrasion of guiding face 51 can be further reduced.

As described above, with the rear wheel-driving silent chain pertaining to an aspect of the invention, if the distance from the pinhole center line of the link plate to the surface facing the chain guide is denoted as hl, and if the distance from the pinhole center line of the guide link to the surface facing the chain guide is denoted as hg, the relationship $hg > hl$ is established. Thus, the clearance between the chain guide contact face of the link plate and the guiding face of the chain guide can be increased while in contact with the chain guide. As a result, only the chain guide contact face of the guide link can be brought into contact with the guiding face of the chain guide over a long driving time. In this manner, contact pressure on the guiding face can be reduced, resulting in the effect that abrasion of the guiding face can be reduced.

In addition, with the rear wheel-driving silent chain pertaining to another aspect of the invention, if the clearance between the pinhole of the link plate and the linking pin is denoted as c, the relationship $hg \geqq hl + c/2$ is established. In this case, the clearance between the chain guide contact face of the link plate and the guiding face of the chain guide is greater than or equal to c. Thus, even after abrasion of the chain guide contact face of the guide link and the guiding face of the chain guide are taken into consideration, only the chain guide contact face of the guide link can be brought into contact with the guiding face of the chain guide over even longer driving times, resulting in the effect that abrasion of the guiding face can be further reduced.

What is claimed is:

1. A silent chain for reducing wear on a chain guide surface, the chain comprising:

a plurality of link plates each having a pair of tooth parts and pin holes, the link plates arranged in a thickness direction as well as in a length direction, adjacent link plates rotatably linked together using linking pins;

guide links each having a pair of pin holes disposed on outermost sides of the link plates and fixed to the linking pins;

wherein a first distance from a pin hole centerline of each link plate to a link plate surface facing the chain guide is greater than a second distance from a pin hole centerline of each guide link to a guide link surface facing the chain guide, the ratio of the first distance to the second distance effective to prevent substantial contact between the guide link surfaces and the chain guide surface when the chain engages the chain guide; and the guide link pin holes have a diameter $\phi Dg$, the link plate pin holes have a diameter $\phi Dl$, the pins have a diameter $\phi d$, the link plate first distance is hl, the guide link second distance is hg, and the distance between the guide link surfaces and the chain guide is e; the relationship between the link plate pin holes and e is expressed by the formula $e = \frac{1}{2}(\phi Dl - \phi d)$; and $hl - hg$ is greater than or equal to e.

2. A silent chain according to claim 1, wherein the guide link pin hole diameter $\phi Dg$ is substantially the same as the pin diameter $\phi d$, and the ratio of the guide link distance hg to the link pin hole diameter $\phi Dl$ is sufficient to permit the rotation of the link plates about the pins while preventing substantial contact between the guide link surfaces and the chain guide surfaces when the chain engages the chain guide.

3. A silent chain for reducing wear on a chain guide surface, the chain comprising:

a plurality of link plates each having at least one pair of tooth parts arid a pin hole, one tooth part of each pair above and the other below a pin hole centerline, the link plates arranged in a thickness direction as well as in a length direction, adjacent link plates rotatably linked together using linking pins, guide links disposed on outermost sides of the link plates and fixed to the linking pins, wherein a clearance is provided between the link plate pin holes and the linking pins therein such that a first distance from the pin hole of each link plate to the distal surface of the tooth part facing the chain guide is less than a second distance from the pin hole centerline of each guide link to a guide link surface facing the chain guide, the link plate pin hole clearance and ratio of the first distance to the second distance is effective to prevent substantial abrasive contact between the tooth part distal surfaces and the chain guide when the chain engages the chain guide, and the guide link pin holes have a diameter ϕDg, the link plate pin holes have a diameter ϕDl, the pins have a diameter ϕd, the link plate first distance is hl, the guide link second distance is hg, and the distance between the link plate surfaces and the chain guide is e; the relationship between the link plate pin holes and a is expressed by the formula $e=1/2(\phi Dl-\phi d)$; and hg−hl is greater than or equal to e.

4. A silent chain according to claim 3, wherein the guide link pin hole diameter ϕDg is substantially the same as the pin diameter ϕd, and the ratio of the guide link distance hg to the link pin hole diameter ϕDl is sufficient to permit the rotation of the link plates about the pins while preventing substantial contact between the link plate teeth and the chain guide surfaces when the chain engages the chain guide.

5. A silent chain having a plurality of links for reducing wear on a chain guide surface when the chain runs thereover, the chain comprising:

a plurality of guide plates having a pair of apertures therethrough for generally fixedly receiving pins to define links, the guide plates having a contact surface;

a plurality of link plates having a pair of apertures therethrough for pivotally receiving the pins to interconnect the links, the link plates having a contact surface with an area smaller than the surface area of the guide contact surface;

the guide plate apertures and the link plate apertures relatively positioned to generally maintain the guide plate contact surface in contact with the chain guide surface and the link plate contact surfaces spaced from the chain guide surface to reduce wear on the chain guide surface, wherein half of a clearance distance between the pin hole of said link plate and the linking pin in addition to a distance from a pin hole centerline of said guide link to guide link surface facing the chain guide is less than or equal to a distance from a pin hole centerline of the link plate to a link plate surface facing the chain guide.

6. A silent chain for reducing wear on a chain guide surface, the chain comprising:

a plurality of link plates each having a pair of both parts and pin holes, the link plates arranged in a thickness direction as well as in a length direction, adjacent link plates rotatably linked together using linking pins;

guide links each having a pair of pin holes, the guide links disposed on outermost sides of the link plates and fixed to the linking pins at their pin holes;

wherein a first distance from a pin hole centerline of each said link plate to a link plate surface facing the chain guide is greater than a second distance from a pin hole centerline of each said guide link to a guide link surface facing the chain guide when in engagement with the chain guide, the ratio of the first distance to the second distance effective to prevent substantial contact between the guide link surfaces and the chain guide surface when the chain engages the chain guide, wherein half of a clearance distance between the pin hole of said link plate and the linking pin in addition to a distance from a pin hole centerline of said guide link to guide link surface facing the chain guide is less than or equal to a distance from a pin hole centerline of the link plate to a link plate surface facing the chain guide.

7. A silent chain for reducing wear on a chain guide surface, the chain comprising:

a plurality of link plates each having at least one pair of tooth parts and a pin hole, one tooth part of each pair above and the other below a pin hole centerline, the link plates arranged in a thickness direction as well as in a length direction, adjacent link plates rotatably linked together using linking pins, guide links disposed on outermost sides of the link plates and fixed to the linking pins, wherein a first distance from the pin hole centerline of each link plate to the distal surface of the tooth part facing the chain guide is less than a second distance from the pin hole centerline of each guide link to a guide link surface facing the chain guide, the ratio of the first distance to the second distance is effective to prevent substantial contact between the tooth part distal surfaces and the chain guide when the chain engages the chain guide, and wherein half of a clearance distance between the pin hole of the link plate and the linking pin in addition to a distance from a pin hole centerline of the link plate to a link plate surface facing the chain guide is less than or equal to a distance from a pin hole centerline of the guide link to guide link surface facing the chain guide.

* * * * *